US011952555B2

(12) United States Patent
Smets et al.

(10) Patent No.: US 11,952,555 B2
(45) Date of Patent: *Apr. 9, 2024

(54) FABRIC TREATMENT COMPOSITIONS COMPRISING BENEFIT AGENT CAPSULES

(71) Applicant: The Procter & Gamble Company, Cincinnati, OH (US)

(72) Inventors: Johan Smets, Lubbeek (BE); Conny Erna Alice Joos, Buggenhout (BE); Pascale Claire Annick Vansteenwinckel, Weerde (BE)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/692,233

(22) Filed: Mar. 11, 2022

(65) Prior Publication Data

US 2022/0195342 A1 Jun. 23, 2022

Related U.S. Application Data

(63) Continuation of application No. 16/535,101, filed on Aug. 8, 2019, now Pat. No. 11,312,924.

(30) Foreign Application Priority Data

Aug. 14, 2018 (EP) .................................... 18189055

(51) Int. Cl.

| | |
|---|---|
| ***C11D 1/00*** | (2006.01) |
| ***C11D 3/16*** | (2006.01) |
| ***C11D 3/28*** | (2006.01) |
| ***C11D 3/34*** | (2006.01) |
| ***C11D 3/42*** | (2006.01) |
| ***C11D 3/50*** | (2006.01) |
| ***C11D 11/00*** | (2006.01) |
| ***C11D 17/04*** | (2006.01) |

(52) U.S. Cl.

CPC ................ *C11D 3/349* (2013.01); *C11D 1/00* (2013.01); *C11D 3/28* (2013.01); *C11D 3/34* (2013.01); *C11D 3/42* (2013.01); *C11D 3/505* (2013.01); *C11D 11/0017* (2013.01); *C11D 17/042* (2013.01)

(58) Field of Classification Search

CPC .... C11D 1/00; C11D 3/28; C11D 3/34; C11D 3/42; C11D 17/042

USPC ......................... 510/325, 356, 394, 492, 500

See application file for complete search history.

(56) References Cited

U.S. PATENT DOCUMENTS

| | | | | |
|---|---|---|---|---|
| 4,244,836 | A | 1/1981 | Frensch | |
| 6,194,375 | B1 | 2/2001 | Ness | |
| 6,488,917 | B2 | 12/2002 | Chevalier et al. | |
| 9,074,305 | B2 | 7/2015 | Glenn, Jr. et al. | |
| 9,644,174 | B2 | 5/2017 | Miravet Celades | |
| 9,951,300 | B2 | 4/2018 | Liu et al. | |
| 11,312,924 | B2 * | 4/2022 | Smets | C11D 3/34 |
| 11,339,356 | B2 * | 5/2022 | Smets | C11D 3/30 |
| 11,634,668 | B2 | 4/2023 | Smets et al. | |
| 2008/0206830 | A1 | 8/2008 | Becker et al. | |
| 2008/0305982 | A1 | 12/2008 | Smets | |
| 2012/0028874 | A1 | 2/2012 | Fernandez et al. | |
| 2013/0303427 | A1 | 11/2013 | Fernandez Prieto et al. | |
| 2014/0342972 | A1 | 11/2014 | Smets | |
| 2016/0090555 | A1 | 3/2016 | Frankenbach | |
| 2016/0319228 | A1 | 11/2016 | Lant | |
| 2017/0130172 | A1 | 5/2017 | Smets | |
| 2017/0175058 | A1 | 6/2017 | Depoot | |
| 2017/0189283 | A1 | 7/2017 | Sasaki | |
| 2017/0211018 | A1 | 7/2017 | Dykstra | |
| 2017/0211019 | A1 | 7/2017 | Sivik | |
| 2017/0216166 | A1 | 8/2017 | Sasaki et al. | |
| 2017/0273877 | A1 | 9/2017 | Sasaki | |
| 2017/0298308 | A1 | 10/2017 | Labeque et al. | |
| 2018/0178183 | A1 | 6/2018 | Berthier | |
| 2018/0265816 | A1 | 9/2018 | Lintula | |
| 2018/0265818 | A1 | 9/2018 | Smets | |
| 2018/0265823 | A1 | 9/2018 | Song | |
| 2018/0265824 | A1 | 9/2018 | Song | |
| 2018/0265826 | A1 | 9/2018 | Song | |
| 2018/0362892 | A1 | 12/2018 | Beckholt | |
| 2020/0056120 | A1 | 2/2020 | Smets | |
| 2020/0056123 | A1 | 2/2020 | Smets | |
| 2020/0056126 | A1 | 2/2020 | Smets | |
| 2020/0063069 | A1 | 2/2020 | Randall et al. | |

FOREIGN PATENT DOCUMENTS

| | | | |
|---|---|---|---|
| EP | 3611246 | B1 | 3/2021 |
| JP | S54113420 | A | 9/1979 |
| JP | 2004300660 | A | 10/2004 |
| JP | 2009525414 | A | 7/2009 |
| JP | 2013538885 | A | 10/2013 |
| JP | 2014125685 | A | 7/2014 |

(Continued)

OTHER PUBLICATIONS

All Office Actions, U.S. Appl. No. 16/535,101, filed Aug. 8, 2019.
All Office Actions, U.S. Appl. No. 16/535,103, filed Aug. 8, 2019.
All Office Actions; U.S. Appl. No. 16/535,105, filed Aug. 8, 2019.
Extended EP Search Report and Written Opinion for 21161088.6-1105 dated Apr. 19, 2021, 7 pages.
Third Party Opposition for 18189055.9 dated Dec. 22, 2021, 1 page.
Extended European Search Report and Search Opinion; Application Ser. No. 18189055.9-1106; dated Mar. 4, 2019; 7 pages.
International Search Report and Written Opinion; Application Ser. No. PCT/US2019/046468; dated Sep. 20, 2019; 8 pages.
OECD SIDS—Fluorescent Brightener FWA-1, pp. 1 to 11 (2005).
Sekisui "Selvol" Safety Data Sheet, Sep. 16, 2011.
Sekisui, "The Optical Brightener Carrier of Choice in Paper/Paperboard Coatings", https://www.sekisui-sc.com/wp-content/uploads/SelvolPVOH_OBCarrier_EN.pdf; dated Jul. 29, 2019; 9 pages.
"Tinopal® CBS-X" Technical Data Sheet, BASF, Mar. 2011.

(Continued)

*Primary Examiner* — Gregory R Delcotto

(74) *Attorney, Agent, or Firm* — Andrew J. Mueller; Gregory S. Darley-Emerson

(57) ABSTRACT

Fabric treatment compositions that include benefit agent capsules and diaminostilbene brightener. Methods of using the same. Wash water containing such compositions.

7 Claims, No Drawings

(56) References Cited

FOREIGN PATENT DOCUMENTS

| | | | |
|---|---|---|---|
| JP | 2014534983 | A | 12/2014 |
| JP | 2015528828 | A | 10/2015 |
| JP | 2017172097 | A | 9/2017 |
| JP | 2017535628 | A | 11/2017 |
| JP | 2019509402 | A | 4/2019 |
| WO | 2013188331 | A1 | 12/2013 |
| WO | 2015031418 | A1 | 3/2015 |
| WO | 2017004339 | A1 | 1/2017 |
| WO | 2017004343 | A1 | 1/2017 |
| WO | 2017011736 | A1 | 1/2017 |
| WO | 2017156141 | A1 | 9/2017 |

OTHER PUBLICATIONS

All Office Actions; U.S. Appl. No. 18/187,926, filed Mar. 22, 2023.

Experimental Report—Apr. 2023, Opposition Proceedings—European Patent Nos. 3611246 & 2611247, 4 pages.

Unpublished U.S. Appl. No. 18/187,926, filed Mar. 22, 2023, to Johan (NMN) Smets et al.

* cited by examiner

FABRIC TREATMENT COMPOSITIONS COMPRISING BENEFIT AGENT CAPSULES

FIELD OF INVENTION

The present disclosure relates to fabric treatment compositions comprising benefit agent capsules and diaminostilbene brightener, and using same.

BACKGROUND OF THE INVENTION

Fabric treatment compositions used in the laundry process provide benefits to fabrics delivered by benefit agents. One example of such benefit is maintenance of the vivid appearance provided by brighteners. Another example is the pleasant smell provided by perfumes. A problem in the field is that much of the benefit agents, and in particular perfume, is either not deposited or rinsed away during fabric treatment. Because perfumes and other benefit agents are expensive components, encapsulation can be used in order to improve the delivery of the benefit agent during use. Benefit agent capsules typically contain the benefit agent until the capsule is fractured during use, thereby releasing the benefit agent. As such, upon fracturing of benefit agent capsules containing perfume, the perfume release provides freshness benefits.

It remains a challenge, however, to deposit benefit agent capsules effectively on treated fabrics, especially if the benefit agent capsules are contained in a fabric treatment composition that is diluted into a wash solution during use for treating surfaces such as fabric fibers (e.g. laundry detergents or fabric softeners). Deposition aids have been previously identified to improve the deposition of benefit agent capsules. However, the addition of depositions aids to fabric treatment compositions requires incremental cost and complexity at the making facility because an additional ingredient requires additional pumps and storage tanks.

Therefore, there remains a need to improve the deposition of benefit agent capsules on fabrics to enhance the delivery of benefit agents to provide longer lasting benefits during and after use of the fabric treatment composition whilst minimizing cost and complexity of the formula of the fabric treatment composition.

WO2016049456 A1 relates to capsule aggregates contain two or more benefit particles each containing an active material and a polymeric material that immobilizes the active material; one or more binder polymers each having an anionic chemical group that is negatively charged or capable of being negatively charged; and one or more deposition polymers each having a cationic chemical group that is positively charged or capable of being positively charged. WO201701385 relates to benefit agent capsules coated by a particular mixture of copolymers. US20170189283 A1 relates to a microcapsule composition containing benefit agent capsules coated with a deposition protein, e.g., a protein-silanol copolymer, a protein-silane copolymer, a protein-siloxane copolymer, or a cationically modified protein.

SUMMARY OF THE INVENTION

The present disclosure relates to fabric treatment compositions comprising benefit agent capsules wherein the benefit agent capsules comprise a shell material wherein said shell material is derived from polyvinylalcohol and a shell component. The fabric treatment further comprises a surfactant and a diaminostilbene brightener.

The present disclosure further relates to wash water comprising the fabric treatment composition.

The present disclosure further relates to the use of such a fabric treatment composition to improve the deposition of benefit agent capsules.

One aim of the present disclosure is to improve deposition of benefit agent capsules.

DETAILED DESCRIPTION OF THE INVENTION

Definitions

As used herein, the term "fabric treatment composition" is a subset of cleaning and treatment compositions that includes, unless otherwise indicated, granular or powder-form all-purpose or "heavy-duty" washing agents, especially cleaning detergents; liquid, gel or paste-form all-purpose washing agents, especially the so-called heavy-duty liquid types; liquid fine-fabric detergents; liquid cleaning and disinfecting agents, fabric conditioning products including softening and/or freshening that may be in liquid, solid and/or dryer sheet form; as well as cleaning auxiliaries such as bleach additives and "stain-stick" or pre-treat types, substrate-laden products such as dryer added sheets, dry and wetted wipes and pads, nonwoven substrates, and sponges; as well as sprays and mists. All of such products which are applicable may be in standard, concentrated or even highly concentrated form even to the extent that such products may in certain aspect be non-aqueous.

As used herein, articles such as "a" and "an" when used in a claim, are understood to mean one or more of what is claimed or described.

As used herein, the terms "include", "includes" and "including" are meant to be non-limiting.

As used herein, the term "solid" includes granular, powder, bar, lentils, beads and tablet product forms.

As used herein, the term "fluid" includes liquid, gel, paste, slurry and gas product forms.

Unless otherwise noted, all component or composition levels are in reference to the active portion of that component or composition, and are exclusive of impurities, for example, residual solvents or by-products, which may be present in commercially available sources of such components or compositions.

All percentages and ratios are calculated by weight unless otherwise indicated. All percentages and ratios are calculated based on the total composition unless otherwise indicated.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Fabric Treatment Composition

The fabric treatment composition according to the present disclosure comprises benefit agent capsules wherein the benefit agent capsules comprise a shell material encapsulating a core material, wherein said shell material is derived from polyvinylalcohol and a shell component wherein said shell component is selected from the list consisting of polyamine, melamine formaldehyde, polyurea, polyurethane, polysaccharide, modified polysaccharide, urea crosslinked with formaldehyde, urea crosslinked with glutaraldehyde, siliconedioxide, sodium silicate, polyester, polyacrylamide, and mixtures thereof; said core material comprises a benefit agent. The fabric treatment composition further comprises a diaminostilbene brightener and preferably at least 1% of surfactant. The fabric treatment composition can be a solid or a liquid; preferably the fabric treatment composition is liquid.

Diaminostilbene Brightener.

The fabric treatment composition of the present disclosure comprises a diaminostilbene brightener selected from

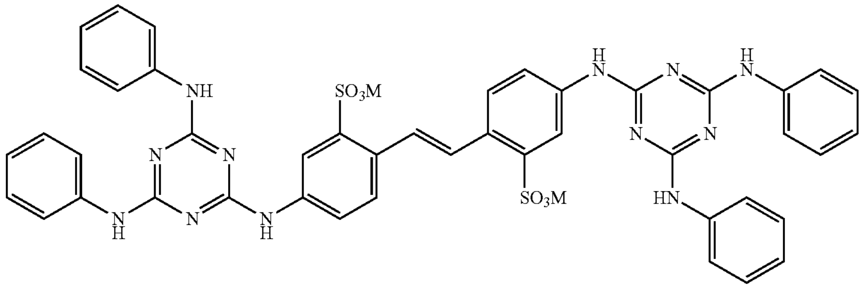
,

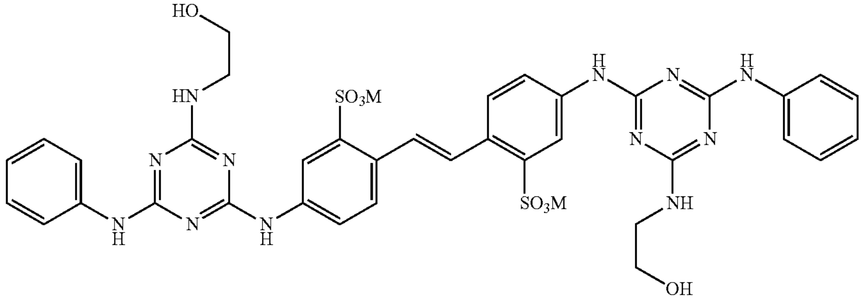
,

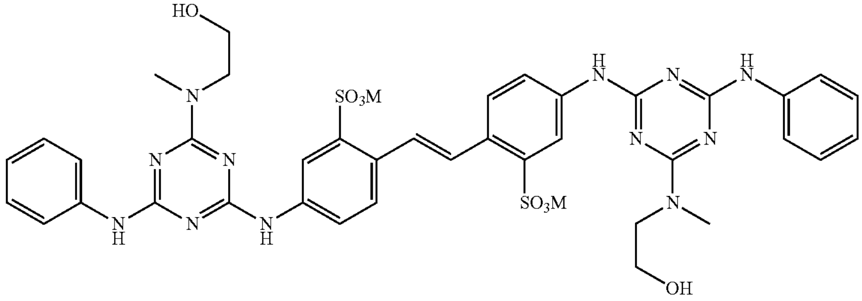
,

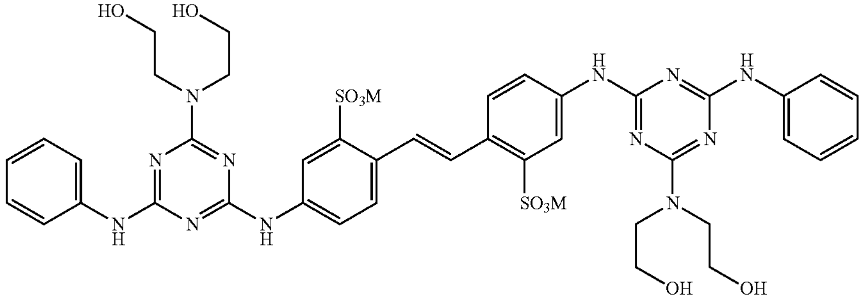
,

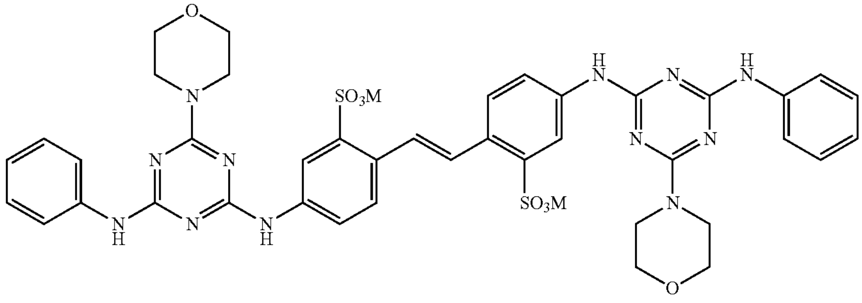
, and mixtures thereof, wherein M is a suitable cation, preferably M is $H^+$ or $Na^+$, more preferably M is $Na^+$.

It was surprisingly found that the selected diaminostilbene brighteners according to the present invention provide improved deposition of benefit agent capsules wherein the benefit agent capsules comprise a shell material encapsulating a core material, wherein said shell material is derived from polyvinylalcohol and a shell component. Without wishing to be bound by theory, it is believed that the deposition is improved through the interaction between polyvinylalcohol and the diaminostilbene brightener according to the present invention.

In preferred fabric treatment compositions, the brightener is selected from the list consisting of

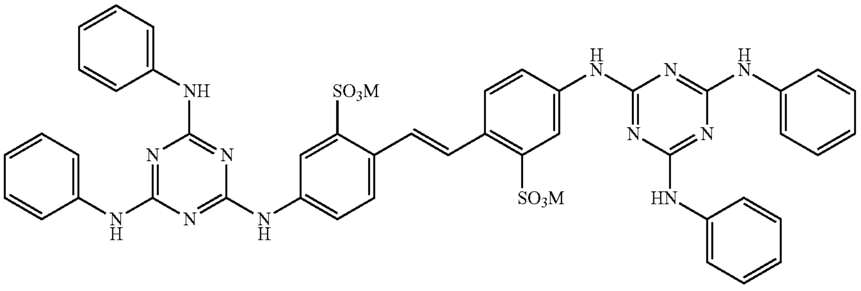

,

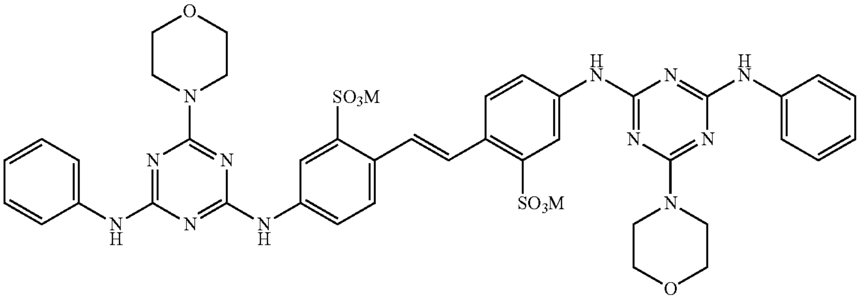

,

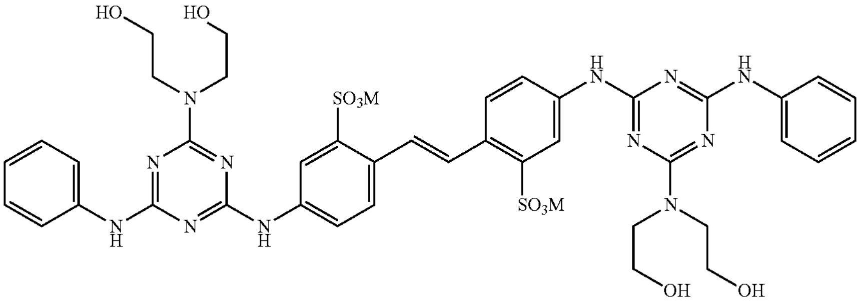

, and mixtures thereof. Most preferable, the brightener is

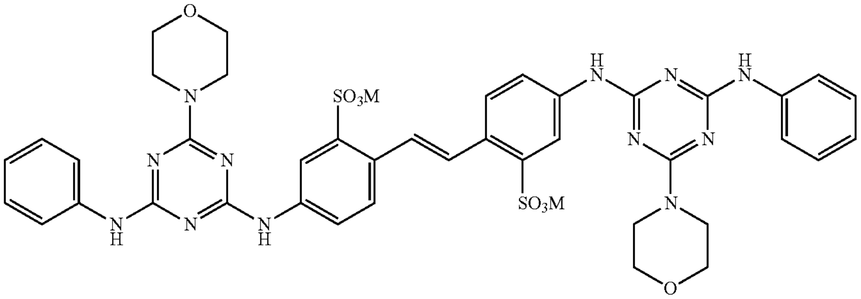

.

Examples of suitable diaminostilbene brighteners can be supplied under the tradename Tinopal® DMA-X, Tinopal® AMS-GX, Tinopal® DMA-X Conc, Tinopal® AMS Slurry 43, Tinopal® 5BM-GX supplied by BASF, Optiblanc supplied by 3V Sigma, and Megawhite DMX-C, supplied by Meghmani.

In preferred fabric treatment compositions, less than 1%, more preferably less than 0.01%, of the total amount of diaminostilbene brightener, according to the present invention, in the fabric treatment composition is encapsulated in the benefit agent capsules. Non-encapsulated diaminostilbene brightener provides a vivid appearance and improved benefit agent capsule deposition to treated fabrics.

In preferred fabric treatment compositions, the total level of diaminostilbene brightener is from 0.01% to 2%, preferably from 0.04% to 1.5%, more preferably from 0.06% to 1%, most preferably from 0.1% to 0.5% by weight of the composition.

In preferred fabric treatment compositions, the ratio of diaminostilbene brightener to benefit agent capsules is from 50/1 to 1/500, more preferably from 10/1 to 1/250 most preferably from 5/1 to 1/100.

In one aspect of the invention, the level of diaminostilbene brightener in wash water comprising the fabric treatment composition is from 0.1 to 50 ppm, preferably from 1 to 30 ppm, more preferably from 2 to 20 ppm, even more preferably from 2 to 10 ppm by weight of the wash water.

The diaminostilbene brightener can be added separately to the fabric treatment composition comprising the rest of the ingredients.

Preferred fabric treatment compositions comprise the diaminostilbene brightener according to the present invention wherein the diaminostilbene brightener is premixed prior to the addition to the remaining ingredients of the fabric treatment composition and wherein the premix comprises the diaminostilbene brightener, water, and a component selected from the list consisting of organic solvents, nonionic surfactant, and mixtures thereof; preferably wherein the organic solvent is selected from the list consisting of diethylene glycol, monoethanolamine, 1,2-propanediol, and mixtures thereof; preferably wherein the nonionic surfactant is ethoxylated alcohol. The diaminostilbene brightener premix facilitates homogeneous distribution of the brightener throughout the fabric treatment composition. Without wishing to be bound by theory, the Applicant believes that homogeneous distribution of the diaminostilbene brightener further improves benefit agent capsule deposition onto fabrics.

Benefit Agent Capsules

The fabric treatment composition comprises benefit agent capsules comprising a core material and a shell material encapsulating said core material wherein said shell material is derived from polyvinylalcohol and a shell component wherein said shell component is selected from the list consisting of polyacrylate, polyamine, melamine formaldehyde, polyurea, polyurethane, polysaccharide, modified polysaccharide, urea crosslinked with formaldehyde, urea crosslinked with glutaraldehyde, siliconedioxide, sodium silicate, polyester, poly acrylamide, and mixtures thereof.

The level of benefit agent capsules may depend on the desired total level of free and encapsulated benefit agent in the fabric treatment composition. In preferred fabric treatment compositions, the level of benefit agent capsules is from 0.01 wt % to 10 wt %, 0.03 wt % to 5 wt %, 0.05 wt % to 4 wt % by weight of the fabric treatment composition. With "level of benefit agent capsules" we herein mean the sum of the shell material and the core material.

In preferred compositions, said shell component is selected from the list consisting of polyacrylate, polyamine, polyurea, polyurethane, polysaccharide, modified polysaccharide, urea crosslinked with formaldehyde, urea crosslinked with glutaraldehyde, siliconedioxide, sodium silicate, polyester, polyacrylamide, and mixtures thereof; more preferably said shell component is selected from the list consisting of polyamine, polyurea, polyurethane, polyacrylate, and mixtures thereof; even more preferably said shell component is selected from polyurea, polyacrylate, and mixtures thereof; most preferably said shell component is polyacrylate.

The shell component may include from about 50% to about 100%, or from about 70% to about 100%, or from about 80% to about 100% of a polyacrylate polymer. The polyacrylate may include a polyacrylate cross linked polymer.

The shell material may include a material selected from the group consisting of a polyacrylate, a polyethylene glycol acrylate, a polyurethane acrylate, an epoxy acrylate, a polymethacrylate, a polyethylene glycol methacrylate, a polyurethane methacrylate, an epoxy methacrylate, and mixtures thereof.

The shell material of the capsules may include a polymer derived from a material that comprises one or more multifunctional acrylate moieties. The multifunctional acrylate moiety may be selected from the group consisting of tifunctional acrylate, tetra-functional acrylate, penta-functional acrylate, hexa-functional acrylate, hepta-functional acrylate and mixtures thereof. The multifunctional acrylate moiety is preferably hexa-functional acrylate. The shell material may include a polyacrylate that comprises a moiety selected from the group consisting of an acrylate moiety, methacrylate moiety, amine acrylate moiety, amine methacrylate moiety, a carboxylic acid acrylate moiety, carboxylic acid methacrylate moiety and combinations thereof, preferably an amine methacrylate or carboxylic acid acrylate moiety.

The shell material may include a material that comprises one or more multifunctional acrylate and/or methacrylate moieties. The ratio of material that comprises one or more multifunctional acrylate moieties to material that comprises one or more methacrylate moieties may be from about 999:1 to about 6:4, preferably from about 99:1 to about 8:1, more preferably from about 99:1 to about 8.5:1.

In one aspect, the shell component is polyurea or polyurethane. Capsules wherein the shell component is derived from polyurea or polyurethane can be prepared using one or more polyisocyanates and one or more cross-linker agents.

A polyisocyanate is a molecule having two or more isocyanate groups, i.e., O═C═N—, wherein said polyisocyanate can be aromatic, aliphatic, linear, branched, or cyclic. In certain embodiments, the polyisocyanate contains, on average, 2 to 4 —N═C═O groups. In particular embodiments, the polyisocyanate contains at least three isocyanate functional groups. In certain embodiments, the polyisocyanate is water-insoluble.

The polyisocyanate can be an aromatic or aliphatic polyisocyanate. Desirable aromatic polyisocyanates each have a phenyl, tolyl, xylyl, naphthyl or diphenyl moiety or a combination thereof as the aromatic component. In certain embodiments, the aromatic polyisocyanate is a polymeric methylene diphenyl diisocyanate ("PMDI"), a polyisocyanurate of toluene diisocyanate, a trimethylol propane-adduct of toluene diisocyanate or a trimethylol propane-adduct of xylylene diisocyanate.

Suitable aliphatic polyisocyanates include trimers of hexamethylene diisocyanate, trimers of isophorone diisocyanate or biurets of hexamethylene diisocyanate. Additional examples include those commercially available, e.g., BAYHYDUR N304 and BAYHYDUR N305, which are aliphatic water-dispersible polyisocyanates based on hexamethylene diisocyanate; DESMODUR N3600, DESMODUR N3700, and DESMODUR N3900, which are low viscosity, polyfunctional aliphatic polyisocyanates based on hexamethylene diisocyanate; and DESMODUR 3600 and DESMODUR N100 which are aliphatic polyisocyanates based on hexamethylene diisocyanate, each of which is available from Bayer Corporation (Pittsburgh, Pa.).

Specific examples of wall monomer polyisocyanates include 1,5-naphthylene diisocyanate, 4,4'-diphenylmethane diisocyanate (MDI), hydrogenated MDI (H12MDI), xylylene diisocyanate (XDI), tetramethylxylol diisocyanate (TMXDI), 4,4'-diphenyldimethylmethane diisocyanate, di- and tetraalkyldiphenylmethane diisocyanate, 4,4'-dibenzyl diisocyanate, 1,3-phenylene diisocyanate, 1,4-phenylene diisocyanate, the isomers of tolylene diisocyanate (TDI), optionally in a mixture, 1-methyl-2,4-diisocyanatocyclohexane, 1,6-diisocyanato-2,2,4-trimethylhexane, 1,6-diisocyanato-2,4,4-trimethylhexane, 1-isocyanatomethyl-3-isocyanato-1,5,5-trimethylcyclohexane, chlorinated and brominated diisocyanates, phosphorus-containing diisocyanates, 4,4'-diisocyanatophenylperfiuoroethane, tetramethoxybutane 1,4-diisocyanate, butane 1,4-diisocyanate, hexane 1,6-diisocyanate (HDI), dicyclohexylmethane diisocyanate, cyclohexane 1,4-diisocyanate, ethylene diisocyanate, phthalic acid bisisocyanatoethyl ester, also polyisocyanates with reactive halogen atoms, such as 1-chloromethylphenyl 2,4-diisocyanate, 1-bromomethylphenyl 2,6-diisocyanate, 3,3-bischloromethyl ether 4,4'-diphenyldiisocyanate.

Other suitable commercially-available polyisocyanates include LUPRANATE M20 (PMDI, commercially available from BASF containing isocyanate group “NCO” 31.5 wt %), where the average n is 0.7; PAPI 27 (PMDI commercially available from Dow Chemical having an average molecular weight of 340 and containing NCO 31.4 wt %) where the average n is 0.7; MONDUR MR (PMDI containing NCO at 31 wt % or greater, commercially available from Bayer) where the average n is 0.8; MONDUR MR Light (PMDI containing NCO 31.8 wt 00 commercially available from Bayer) where the average n is 0.8; MONDUR 489 (PMDI commercially available from Bayer containing NCO 30-31.4 wt %) where the average n is 1.0; poly [(phenylisocyanate)-co-formaldehyde] (Aldrich Chemical, Milwaukee, Wis.), other isocyanate monomers such as DESMODUR N3200 (poly(hexamethylene diisocyanate) commercially available from Bayer), and TAKENATE D110-N (xylene diisocyanate adduct polymer commercially available from Mitsui Chemicals corporation, Rye Brook, N.Y., containing NCO 11.5 wt %), DESMODUR L75 (a polyisocyanate base on toluene diisocyanate commercially available from Bayer), DESMODUR IL (another polyisocyanate based on toluene diisocyanate commercially available from Bayer), and DESMODUR RC (a polyisocyanurate of toluene diisocyanate).

The average molecular weight of certain suitable polyisocyanates varies from 250 to 1000 Da and preferable from 275 to 500 Da. In general, the range of the polyisocyanate concentration varies from 0.1% to 10%, preferably from 0.1% to 8%, more preferably from 0.2 to 5%, and even more preferably from 1.5% to 3.5%, all based on the weight of the benefit agent capsule.

Cross-linkers or cross-linking agents suitable for use with polyisocyanates each contain multiple (i.e., two or more) functional groups (e.g., —NH—, —NH2 and —OH) that can react with polyisocyanates to form polyureas or polyurethanes. Examples include polyfunctional amines containing two or more amine groups (e.g., polyamines), polyfunctional alcohols containing two or more hydroxyl groups (e.g., polyols), epoxy cross-linkers, acrylate crosslinkers, and hybrid cross-linking agents containing one or more amine groups and one or more hydroxyl groups.

Amine groups in the cross-linking agents include —NH2 and R*NH, R* being substituted and unsubstituted $C_1$-$C_{20}$ alkyl, $C_1$-$C_{20}$ heteroalkyl, $C_1$-$C_{20}$ cycloalkyl, 3- to 8-membered heterocycloalkyl, aryl, and heteroaryl.

Two classes of such polyamines include polyalkylene polyamines having the following structures:

$$H-(NH(CH_2)_m)_n-NH_2$$

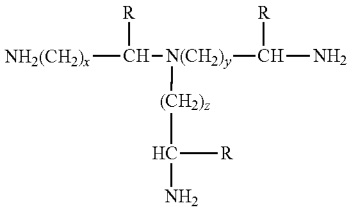

in which R is hydrogen or —$CH_3$; and m, n, x, y, and z each are independently integers from 0-2000 (e.g., 1, 2, 3, 4 or 5).

Examples include ethylene diamine, 1,3-diaminepropane, diethylene triamine, triethylene tetramine, 1,4-diaminobutane, hexaethylene diamine, hexamethylene diamine, pentaethylenehexamine, melamine and the like.

Another class of polyamines are polyalykylene polyamines of the type:

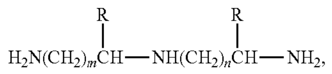

where R equals hydrogen or —$CH_3$, m is 1-5 and n is 1-5, e.g., diethylene triamine, triethylene tetraamine and the like. Exemplary amines of this type also include diethylenetriamine, bis(3-aminopropyl)amine, bis(3-aminopropyl)-ethylenediamine, bis(hexanethylene)triamine.

Another class of amine that can be used in the invention is polyetheramines. They contain primary amino groups attached to the end of a polyether backbone. The polyether backbone is normally based on either propylene oxide (PO), ethylene oxide (EO), or mixed PO/EQ. The ether amine can be monoamine, diamine, or triamine, based on this core structure. An example is:

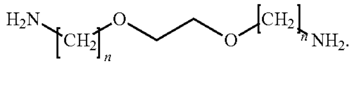

Exemplary polyetheramines include 2,2-(ethylenedioxy)-bis (ethylamine) and 4,7,10-trioxa-1, 13-tridecanediamine.

Other suitable amines include, but are not limited to, tris(2-aminoethyl)amine, triethylenetetramine, N,N'-bis (3-aminopropyl)-1,3-propanediamine, tetraethylene pentamine, 1,2-diaminopropane, 1,2-diaminoethane, N,N,N',N'-tetrakis(2-hydroxyethyl) ethylene diamine, N,N,N',N'-tetrakis(2-hydroxypropyl)ethylene diamine, N,N, N',N'-tetrakis (3-aminopropyl)-1,4-butanediamine, 3,5-diamino-1,2,4-triazole, branched polyethylenimine, 2,4-diamino-6-hydroxypyrimidine and 2,4,6-triaminopyrimidine.

Branched polyethylenimines useful as cross-linking agents typically have a molecular weight of 200 to 2,000,000 Da (e.g., 800 to 2,000,000 Da, 2,000 to 1,000,000 Da, 10,000 to 200,000 Da, and 20,000 to 100,000 Da).

Amphoteric amines, i.e., amines that can react as an acid as well as a base, are another class of amines of use in this invention. Examples of amphoteric amines include proteins and amino acids such as gelatin, L-lysine, D-lysine, L-arginine, D-arginine, L-lysine monohydrochloride, D-lysine monohydrochloride, L-arginine monohydro chloride, D-arginine monohydro chloride, L-omithine monohydrochloride, D-omithine monohydrochioride or a mixture thereof.

Guanidine amines and guanidine salts are yet another class of multi-functional amines of use in this invention. Exemplary guanidine amines and guanidine salts include, but are not limited to, 1,3-diaminoguanidine monohydrochloride, 1,1-dimethylbiguanide hydrochloride, guanidine carbonate and guanidine hydrochloride.

Commercially available examples of amines include JEFFAMINE EDR-148 having a structure shown above (where n=2), JEFFAMINE EDR-176 (where n=3) (from Huntsman).

Other polyether amines include the JEFFAMINE ED Series, JEFFAMINE TRIAMINES, polyethylenimines from BASF (Ludwigshafen, Germany) under LUPASOL grades (e.g., LUPASOL FG, LUPASOL G20 waterfree, LUPASOL PR 8515, LUPASOL WF, LUPASOL FC, LUPASOL G20, LUPASOL G35, LUPASOL G100, LUPASOL G500, LUPASOL HF, LUPASOL PS, LUPASOL HEO 1, LUPASOL PNSO, LUPASOL PN60, LUPASOL P0100 and LUPASOL SK). Other commercially available polyethylenimines include EPOMIN P-1000, EPOMIN P-1050, EPOMIN RP18W and EPOMIN PP-061 from NIPPON SHOKUBAI (New York, N.Y.). Polyvinylamines such as those sold by BASF under LUPAMINE grades can also be used. A wide range of polyetheramines may be selected by those skilled in the art. In certain embodiments, the cross-linking agent is hexamethylene diamine, polyetheramine or a mixture thereof.

The range of polyfunctional amines, polyfunctional alcohols, or hybrid cross-linking agents can vary from 0.1% to 5% (e.g., 0.2% to 3%, 0.2% to 2%, 0.5% to 2%, or 0.5% to 1%) by weight of the benefit agent capsule.

The capsules may comprise an emulsifier, wherein the emulsifier is preferably selected from anionic emulsifiers, nonionic emulsifiers, cationic emulsifiers or mixtures thereof, preferably nonionic emulsifiers.

The shell material of the capsules is derived from polyvinylalcohol, preferably at a level of from 0.01 to 20%, more preferably from 0.05 to 10%, even more preferably from 0.1 to 5%, most preferably from 0.1 to 2% by weight of the capsules. The polyvinylalcohol can partially reside within the shell of the capsules and can partially reside onto the outer surface of the shell.

Preferably, the polyvinylalcohol has at least one the following properties, or a mixture thereof:

(i) a hydrolysis degree from 70% to 99%, preferably 75% to 98%, more preferably from 80% to 96%, more preferably from 82% to 96%, most preferably from 86% to 94%;

(ii) a viscosity of from 2 mPa·s to 150 mPa·s, preferably from 3 mPa·s to 70 mPa·s, more preferably from 4 mPa·s to 60 mPa·s, even more preferably from 5 mPa·s to 55 mPa·s in 4% water solution at 20° C.

In preferred fabric treatment compositions, the weight ratio of polyvinylalcohol to diaminostilbene brightener is from 1/1 to 1/5000, preferably from 1/2 to 1/2000, more preferably from 1/5 to 1/1000, most preferably from 1/10 to 1/500.

Suitable polyvinylalcohol materials may be selected from Selvol 540 PVA (Sekisui Specialty Chemicals, Dallas, TX), Mowiol 18-88=Poval 18-88, Mowiol 3-83, Mowiol 4-98=Poval 4-98 (Kuraray), Poval KL-506=Poval 6-77 KL (Kuraray), Poval R-1130=Poval 25-98 R (Kuraray), Gohsenx K-434 (Nippon Gohsei).

Perfume compositions are the preferred encapsulated benefit agent which improve the smell of fabrics treated with the fabric treatment compositions. The perfume composition comprises perfume raw materials. The encapsulated benefit agent may further comprise essential oils, malodour reducing agents, odour controlling agents, silicone, and combinations thereof.

The perfume raw materials are typically present in an amount of from 10% to 99%, preferably from 20% to 98%, more preferably from 70% to 96%, by weight of the capsule.

The perfume composition may comprise from 2.5% to 30%, preferably from 5% to 30% by weight of perfume composition of perfume raw materials characterized by a log P lower than 3.0, and a boiling point lower than 250° C.

The perfume composition may comprise from 5% to 30%, preferably from 7% to 25% by weight of perfume composition of perfume raw materials characterized by having a log P lower than 3.0 and a boiling point higher than 250° C. The perfume composition may comprise from 35% to 60%, preferably from 40% to 55% by weight of perfume composition of perfume raw materials characterized by having a log P higher than 3.0 and a boiling point lower than 250° C. The perfume composition may comprise from 10% to 45%, preferably from 12% to 40% by weight of perfume composition of perfume raw materials characterized by having a log P higher than 3.0 and a boiling point higher than 250° C.

Preferably, the core also comprises a partitioning modifier. Suitable partitioning modifiers include vegetable oil, modified vegetable oil, propan-2-yl tetradecanoate and mixtures thereof. The modified vegetable oil may be esterified and/or brominated. The vegetable oil comprises castor oil and/or soy bean oil. The partitioning modifier may be propan-2-yl tetradecanoate. The partitioning modifier may be present in the core at a level, based on total core weight, of greater than 10%, or from greater than 10% to about 80%, or from greater than 20% to about 70%, or from greater than 20% to about 60%, or from about 30% to about 60%, or from about 30% to about 50%.

Preferably the capsules have a volume weighted mean particle size from 0.5 microns to 100 microns, preferably from 1 micron to 60 microns, even more preferably from 5 microns to 45 microns.

For example, polyacrylate benefit agent capsules can be purchased from Encapsys, (825 East Wisconsin Ave, Appleton, WI 54911), and can be made as follows with for example perfume as benefit agent: a first oil phase, consisting of 37.5 g perfume, 0.2 g tert-butylamino ethyl methacrylate, and 0.2 g beta hydroxyethyl acrylate is mixed for about 1 hour before the addition of 18 g CN975 (Sartomer, Exter, PA). The solution is allowed to mix until needed later in the process.

A second oil phase consisting of 65 g of the perfume oil, 84 g isopropyl myristate, 1 g 2,2'-azobis(2-methylbutyronitrile), and 0.8 g 4,4'-azobis[4-cyanovaleric acid] is added to a jacketed steel reactor. The reactor is held at 35° C. and the oil solution in mixed at 500 rpm with a 2" flat blade mixer. A nitrogen blanket is applied to the reactor at a rate of 300 cc/min. The solution is heated to 70° C. in 45 minutes and held at 70° C. for 45 minutes, before cooling to 50° C. in 75 minutes. At 50° C., the first oil phase is added and the combined oils are mixed for another 10 minutes at 50° C.

A water phase, containing 85 g Selvol 540 PVA (Sekisui Specialty Chemicals, Dallas, TX) at 5% solids, 268 g water, 1.2 g 4,4'-azobis[4-cyanovaleric acid], and 1.1 g 21.5% NaOH, is prepared and mixed until the 4,4'-AZOBIS[4-CYANOVALERIC ACID] dissolves.

Once the oil phase temperature has decreased to 50° C., mixing is stopped and the water phase is added to the mixed oils. High shear agitation is applied to produce an emulsion with the desired size characteristics (1900 rpm for 60 minutes.)

The temperature is increased to 75° C. in 30 minutes, held at 75° C. for 4 hours, increased to 95° C. in 30 minutes, and held at 95° C. for 6 hours.

Surfactant

In preferred fabric treatment compositions, the composition further comprises a surfactant at a level of from 1 wt % to 70 wt %, preferably from 10 wt % to 40 wt %, more preferably from 15 wt % to 30 wt %.

The surfactant typically comprises anionic surfactant. In preferred fabric treatment compositions, the surfactant can comprise the anionic surfactant at a level of from 1 wt % to 50 wt %, preferably from 10 wt % to 40 wt %, more preferably from 15 wt % to 30 wt %.

Suitable anionic surfactants can be selected from the group consisting of: alkyl sulphates, alkyl ethoxy sulphates, alkyl sulphonates, alkyl benzene sulphonates, fatty acids and their salts, and mixtures thereof. However, by nature, every anionic surfactant known in the art of detergent compositions may be used, such as disclosed in “Surfactant Science Series”, Vol. 7, edited by W. M. Linfield, Marcel Dekker. However, the base mix preferably comprises at least a sulphonic acid surfactant, such as a linear alkyl benzene sulphonic acid, but water-soluble salt forms may also be used.

Anionic sulfonate or sulfonic acid surfactants suitable for use herein include the acid and salt forms of linear or branched C5-C20, more preferably C10-C16, more preferably C11-C13 alkylbenzene sulfonates, C5-C20 alkyl ester sulfonates, C6-C22 primary or secondary alkane sulfonates, C5-C20 sulfonated polycarboxylic acids, and any mixtures thereof, but preferably C11-C13 alkylbenzene sulfonates. The aforementioned surfactants can vary widely in their 2-phenyl isomer content.

Anionic sulphate salts suitable for use in the compositions of the invention include the primary and secondary alkyl sulphates, having a linear or branched alkyl or alkenyl moiety having from 9 to 22 carbon atoms or more preferably 12 to 18 carbon atoms. Also useful are beta-branched alkyl sulphate surfactants or mixtures of commercial available materials, having a weight average (of the surfactant or the mixture) branching degree of at least 50%.

Mid-chain branched alkyl sulphates or sulfonates are also suitable anionic surfactants for use in the compositions of the invention. Preferred are the C5-C22, preferably C10-C20 mid-chain branched alkyl primary sulphates. When mixtures are used, a suitable average total number of carbon atoms for the alkyl moieties is preferably within the range of from greater than 14.5 to 17.5. Preferred mono-methyl-branched primary alkyl sulphates are selected from the group consisting of the 3-methyl to 13-methyl pentadecanol sulphates, the corresponding hexadecanol sulphates, and mixtures thereof. Dimethyl derivatives or other biodegradable alkyl sulphates having light branching can similarly be used.

Other suitable anionic surfactants for use herein include fatty methyl ester sulphonates and/or alkyl alkoxylated sulphates such as alkyl ethyoxy sulphates (AES) and/or alkyl polyalkoxylated carboxylates (AEC).

The anionic surfactants are typically present in the form of their salts with alkanolamines or alkali metals such as sodium and potassium.

For improved stability, the fabric treatment composition can comprise linear alkyl benzene sulfonate surfactant and alkyl alkoxylated sulphate surfactant, such that the ratio of linear alkyl benzene sulfonate surfactant is from 0.1 to 5, preferably from 0.25 to 3, more preferably from 0.75 to 1.5. When used, the alkyl alkoxylated sulphate surfactant is preferably a blend of one or more alkyl ethoxylated sulphates, more preferably having a degree of ethoxylation of from 1 to 10, most preferably from 1.8 to 4.

The fabric treatment composition can comprise nonionic surfactant. The level of nonionic surfactant in the fabric treatment composition can be present at a level of less than 10 wt %, preferably less than 5 wt %, more preferably less than 1 wt %, most preferably less than 0.5 wt %.

Suitable nonionic surfactants include, but are not limited to C12-C18 alkyl ethoxylates (“AE”) including the so-called narrow peaked alkyl ethoxylates and C6-C12 alkyl phenol alkoxylates (especially ethoxylates and mixed ethoxy/propoxy), block alkylene oxide condensate of C6-C12 alkyl phenols, alkylene oxide condensates of C8-C22 alkanols and ethylene oxide/propylene oxide block polymers (Pluronic—BASF Corp.), as well as semi polar nonionics (e.g., amine oxides and phosphine oxides) can be used in the present compositions. An extensive disclosure of these types of surfactants is found in U.S. Pat. No. 3,929,678, Laughlin et al., issued Dec. 30, 1975.

Alkylpolysaccharides such as disclosed in U.S. Pat. No. 4,565,647 Llenado are also useful nonionic surfactants in the compositions of the invention.

Also suitable are alkyl polyglucoside surfactants.

In some embodiments, nonionic surfactants of use include those of the formula $R_1(OC_2H_4)_nOH$, wherein $R_1$ is a C10-C16 alkyl group or a C8-C12 alkyl phenyl group, and n is from preferably 3 to 80. In some embodiments, the nonionic surfactants may be condensation products of C12-C15 alcohols with from 5 to 20 moles of ethylene oxide per mole of alcohol, e.g., C12-C13 alcohol condensed with 6.5 moles of ethylene oxide per mole of alcohol Additional suitable nonionic surfactants include polyhydroxy fatty acid amides of the formula:

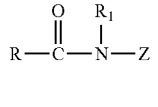

wherein R is a C9-17 alkyl or alkenyl, R1 is a methyl group and Z is glycidyl derived from a reduced sugar or alkoxylated derivative thereof. Examples are N-methyl N-1-deoxyglucityl cocoamide and N-methyl N-1-deoxyglucityl oleamide. Processes for making polyhydroxy fatty acid amides are known and can be found in Wilson, U.S. Pat. No. 2,965,576 and Schwartz, U.S. Pat. No. 2,703,798.

The fabric treatment composition can comprise a zwitterion. Even low levels of the zwitterion have been found to improve the stability of fabric treatment compositions, particularly compositions which comprise little or no organic, non-aminofunctional solvent. The zwitterion can be present at a level of from 0.1 wt % to 5 wt %, preferably from 0.2 wt % to 2 wt %, more preferably from 0.4 wt % to 1 wt %.

Zwitterionic detersive surfactants include those which are known for use in hair care or other personal care cleansing. Non-limiting examples of suitable zwitterions are described in U.S. Pat. No. 5,104,646 (Bolich Jr. et al.), U.S. Pat. No. 5,106,609 (Bolich Jr. et al.). Zwitterionic detersive surfactants are well known in the art, and include those surfactants broadly described as derivatives of aliphatic quaternary ammonium, phosphonium, and sulfonium compounds, in which the aliphatic radicals can be straight or branched chain, and wherein one of the aliphatic substituents contains from 8 to 18 carbon atoms and one contains an anionic group such as carboxy, sulfonate, sulfate, phosphate or phosphonate. Betaines are also suitable zwitterionic surfactants.

The fabric treatment composition can comprise a zwitterionic polyamine. Suitable zwitterionic polymers can be comprised of a polyamine backbone wherein the backbone units which connect the amino units can be modified by the formulator to achieve varying levels of product enhancement, inter alia, boosting of clay soil removal by surfactants, greater effectiveness in high soil loading usage. In addition to modification of the backbone compositions, the formulator may preferably substitute one or more of the backbone amino unit hydrogens by other units, inter alia, alkyleneoxy units having a terminal anionic moiety. In addition, the nitrogens of the backbone may be oxidized to the N-oxide. Preferably at least two of the nitrogens of the polyamine backbones are quaternized.

Solvent

The fabric treatment composition can comprise organic, non-aminofunctional solvent. If present, the organic, non-aminofunctional solvent is preferably present at a level of less than 40%, more preferably less than 15% by weight, more preferably from 1% to 10%, more preferably 1.2% to 7.5%, most preferably from 1.2% to 5.0% by weight of organic, non-aminofunctional solvent. As used herein, "non-aminofunctional organic solvent" refers to any solvent which contains no amino functional groups, indeed contains no nitrogen. Non-aminofunctional solvent include, for example: C1-C5 alkanols such as methanol, ethanol and/or propanol and/or 1-ethoxypentanol; C2-C6 diols; C3-C8 alkylene glycols; C3-C8 alkylene glycol mono lower alkyl ethers; glycol dialkyl ether; lower molecular weight polyethylene glycols; C3-C9 triols such as glycerol; and mixtures thereof. More specifically non-aminofunctional solvent are liquids at ambient temperature and pressure (i.e. 21° C. and 1 atmosphere), and comprise carbon, hydrogen and oxygen.

If used, highly preferred are mixtures of organic non-aminofunctional solvents, especially mixtures of lower aliphatic alcohols such as propanol, butanol, isopropanol, and/or diols such as 1,2-propanediol or 1,3-propanediol; glycerol; diethylene glycol; or mixtures thereof. Preferred is propanediol (especially 1,2-propanediol), or mixtures of propanediol with diethylene glycol.

Hydrotrope

Suitable fabric treatment composition can comprises a hydrotropes. If present, the hydrotropes is preferably present at a level of less than 1%, more preferably at a level of from 0.1% to 0.5% by weight of the liquid composition. Suitable hydrotropes include anionic-type hydrotropes, particularly sodium, potassium, and ammonium xylene sulfonate, sodium, potassium and ammonium toluene sulfonate, sodium potassium and ammonium cumene sulfonate, and mixtures thereof, as disclosed in U.S. Pat. No. 3,915,903. For the avoidance of doubt, hydrotropes, which are also zwitterions, are considered as zwitterions for compositions of the present invention.

Salt

The fabric treatment composition can comprise a non-surfactant salt selected from the group consisting of sodium carbonate, sodium hydrogen carbonate (sodium bicarbonate), magnesium chloride, ethylenediaminetetraacetic acid (EDTA), diethylene triamine pentaacetic acid (DTPA), hydroxyethane diphosphonic acid (HEDP), sodium citrate, sodium chloride, citric acid, calcium chloride, sodium formate, Diethylene triamine penta methylene phosphonic acid, and mixtures thereof. Such non-surfactant salts can be used to increase the amount of liquid crystalline phase present, especially lamellar phase. The non-surfactant salt can be added to provide a level of from 1.5 wt % to 10 wt %, more preferably 2.5 wt % to 7 wt %, most preferably from 3 wt % to 5 wt % of non-surfactant salt in the fabric treatment composition.

The fabric treatment composition preferably comprises from 15% to 85%, preferably from 5% to 70%, more preferably from 10% to 60% of the liquid crystalline phase.

The fabric treatment composition preferably comprises water. The water content can be present at a level of from 10% to 90%, preferably from 25% to 80%, more preferably from 45% to 70% by weight of the fabric treatment composition.

Adjunct Materials

The fabric treatment composition can comprise additional ingredients, such as those selected from the group consisting of polymer deposition aid, organic builder and/or chelant, enzymes, enzyme stabiliser, hueing dyes, particulate material, cleaning polymers, external structurants, and mixtures thereof.

Polymer Deposition Aid: The base mix can comprise from 0.1% to 7%, more preferably from 0.2% to 3%, of a polymer deposition aid. As used herein, "polymer deposition aid" refers to any cationic polymer or combination of cationic polymers that significantly enhance deposition of a fabric care benefit agent onto the fabric during laundering. Suitable polymer deposition aids can comprise a cationic polysaccharide and/or a copolymer. "Benefit agent" as used herein refers to any material that can provide fabric care benefits. Non-limiting examples of fabric care benefit agents include: silicone derivatives, oily sugar derivatives, dispersible polyolefins, polymer latexes, cationic surfactants and combinations thereof. Preferably, the deposition aid is a cationic or amphoteric polymer. The cationic charge density of the polymer preferably ranges from 0.05 milliequivalents/g to 6 milliequivalents/g. The charge density is calculated by dividing the number of net charge per repeating unit by the molecular weight of the repeating unit. In one embodiment, the charge density varies from 0.1 milliequivalents/g to 3 milliequivalents/g. The positive charges could be on the backbone of the polymers or the side chains of polymers.

Organic builder and/or chelant: The base mix can comprise from 0.6% to 10%, preferably from 2 to 7% by weight of one or more organic builder and/or chelants. Suitable organic builders and/or chelants are selected from the group consisting of: MEA citrate, citric acid, aminoalkylenepoly (alkylene phosphonates), alkali metal ethane 1-hydroxy disphosphonates, and nitrilotrimethylene, phosphonates, diethylene triamine penta (methylene phosphonic acid) (DTPMP), ethylene diamine tetra(methylene phosphonic acid) (DDTMP), hexamethylene diamine tetra(methylene phosphonic acid), hydroxy-ethylene 1,1 diphosphonic acid (HEDP), hydroxyethane dimethylene phosphonic acid, ethylene di-amine di-succinic acid (EDDS), ethylene diamine tetraacetic acid (EDTA), hydroxyethylethylenediamine triacetate (HEDTA), nitrilotriacetate (NTA), methylglycinediacetate (MGDA), iminodisuccinate (IDS), hydroxyethyliminodisuccinate (HIDS), hydroxyethyliminodiacetate (HEIDA), glycine diacetate (GLDA), diethylene triamine pentaacetic acid (DTPA), catechol sulfonates such as Tiron™ and mixtures thereof.

Hueing dyes: Hueing dyes, shading dyes or fabric shading or hueing agents are useful laundering adjuncts in fluid laundry detergent compositions. The history of these materials in laundering is a long one, originating with the use of "laundry bluing agents" many years ago. More recent developments include the use of sulfonated phthalocyanine dyes having a Zinc or aluminium central atom; and still more recently a great variety of other blue and/or violet dyes have been used for their hueing or shading effects. See for example WO 2009/087524 A1, WO2009/087034A1 and references therein. The fluid laundry detergent compositions herein typically comprise from 0.00003 wt % to 0.1 wt %, from 0.00008 wt % to 0.05 wt %, or even from 0.0001 wt % to 0.04 wt %, fabric hueing agent.

Particulate material: Suitable particulate materials are clays, suds suppressors, microcapsules e.g., having encapsulated ingredients such as perfumes, bleaches and enzymes in encapsulated form; or aesthetic adjuncts such as pearlescent agents, pigment particles, mica or the like. Particularly preferred particulate materials are microcapsules, especially perfume microcapsules. Microcapsules are typically formed by at least partially, preferably fully, surrounding a benefit agent with a wall material. Preferably, the microcapsule is a perfume microcapsule, where said benefit agent comprises one or more perfume raw materials. Suitable use levels are from 0.0001% to 5%, or from 0.1% to 1% by weight of the fabric treatment composition.

Perfume: Suitable perfumes are known in the art, and are typical incorporated at a level from 0.001 to 10%, preferably from 0.01% to 5%, more preferably from 0.1% to 3% by weight.

Cleaning polymers: Suitable cleaning polymers provide for broad-range soil cleaning of surfaces and fabrics and/or suspension of the soils. Any suitable cleaning polymer may be of use. Useful cleaning polymers are described in USPN 2009/0124528A1. Non-limiting examples of useful categories of cleaning polymers include: amphiphilic alkoxylated grease cleaning polymers; clay soil cleaning polymers; soil release polymers; and soil suspending polymers.

External structurant: Preferred external structurants are uncharged external structurants, such as those selected from the group consisting of non-polymeric crystalline, hydroxyl functional structurants, such as hydrogenated castor oil; microfibrillated cellulose; uncharged hydroxyethyl cellulose; uncharged hydrophobically modified hydroxyethyl cellulose; hydrophobically modified ethoxylated urethanes; hydrophobically modified non-ionic polyols; and mixtures thereof.

Use of a Fabric Treatment Composition Comprising a Diaminostilbene Brightener

Applicants have surprisingly found that diaminostilbene brighteners in a fabric treatment composition according to the present invention provide improved deposition of benefit agent capsules. Without wishing to be bound by theory, Applicants believe that the improved deposition, especially the affinity for cotton fabrics, is caused by the interaction between the diaminostilbene brightener and the polyvinylalcohol of the benefit agent capsules.

Methods

Method to Measure Benefit Agent Capsule Deposition

Fluorescent capsules have been prepared by encapsulating perfume oil combined with a small amount of a fluorescent dye, pyrromethene 546 (PM546) from Sigma Aldrich as described in Ind. Eng. Chem. Res. (2012), 51, 16741. The fabric treated with the fluorescent capsules have been immersed in Ethanol at 60 C in order to extract the fluorescent dye. A small aliquot was taken from the Ethanol solution and its fluorescence intensity (excitation=495 nm, emission=505 nm, slit width=5 mm) measured with a fluorimeter (Perkin Elmer LS50). The fluorescence intensity is proportional to the amount of fluorescent capsules deposited on the fabric.

Method to Measure Viscosity of Polyvinylalcohol Solution

Viscosity is measured using a Brookfield LV series viscometer or equivalent, measured at 4.00%+/−0.05% solids.

a. Prepare a 4.00%+/−0.05% solid solution of polyvinylalcohol.

Weigh a 500 mL beaker and stirrer. Record the weight. Add 16.00+/−0.01 grams of a polyvinylalcohol sample to the beaker. Add approximately 350-375 mL of deionized water to the beaker and stir the solution. Place the beaker into a hot water bath with the cover plate. Agitate at moderate speed for 45 minutes to 1 hour, or until the polyvinylalcohol is completely dissolved. Turn off the stirrer. Cool the beaker to approximately 20° C.

Calculate the final weight of the beaker as follows:

$$\text{Final weight} = (\text{weight of empty beaker \& stirrer}) + (\%\ \text{solids as decimal} \times 400)$$

Example: weight of empty beaker & stirrer=125.0 grams

% solids of polyvinylalcohol (of the sample)=97.50% or 0.9750 as decimal

Final weight=125.0+(0.9750×400)=515.0 grams

Zero the top loading balance and place the beaker of polyvinylalcohol solution with a propeller on it. Add deionized water to bring the weight up to the calculated final weight of 515.0 grams.

Solids content of the sample has to be 4.00+0.05% to measure viscosity.

b. Measure viscosity

Dispense the sample of 4% polyvinylalcohol solution into the chamber of the viscometer, insert the spindle and attach it to the viscometer. Sample adapter (SSA) with chamber SC4-13RPY, Ultralow adapter. The spindles are SC4-18 and 00. Allow the sample to achieve equilibration at 20° C. temperature. Start the viscometer and record the steady state viscosity value.

Report viscosity <13 cP to nearest 0.01 cP, 13-100 cP to nearest 0.1 cP; viscosities over 100 cP are reported to the nearest 1 cP.

Corrections to the measured viscosity are not necessary if the calculated solution solids content is 4.00±0.05%. Otherwise, use the following equation to correct the measured viscosity for solution solids deviations.

$$Log_e \text{ Corrected Viscosity} = \frac{(Log_e \text{ Measured Viscosity})}{(\text{percent solids}) \times (0.2060) + (0.1759)}$$

$$\text{Corrected Viscosity} = 2.718282^{(\text{Log Corrected Viscosity})}$$

EXAMPLES

Polyacrylate perfume capsules were made as follows: a first oil phase, consisting of 37.5 g perfume comprising a fluorescent dye, 0.2 g tert-butylamino ethyl methacrylate, and 0.2 g beta hydroxyethyl acrylate was mixed for about 1 hour before the addition of 18 g CN975 (Sartomer, Exter, PA). The solution was allowed to mix until needed later in the process.

A second oil phase consisting of 65 g of the perfume oil, 84 g isopropyl myristate, 1 g 2,2'-azobis(2-methylbutyronitrile), and 0.8 g 4,4'-azobis[4-cyanovaleric acid] was added to a jacketed steel reactor. The reactor was held at 35° C. and the oil solution in mixed at 500 rpm with a 2" flat blade mixer. A nitrogen blanket was applied to the reactor at a rate of 300 cc/min. The solution was heated to 70° C. in 45 minutes and held at 70° C. for 45 minutes, before cooling to 50° C. in 75 minutes. At 50° C., the first oil phase was added and the combined oils were mixed for another 10 minutes at 50° C.

A water phase, containing 85 g Selvol 540 polyvinylalcohol (Sekisui Specialty Chemicals, Dallas, TX) at 5% solids, 268 g water, 1.2 g 4,4'-azobis[4-cyanovaleric acid], and 1.1 g 21.5% NaOH, was prepared and mixed until the 4,4'-AZOBIS[4-CYANOVALERIC ACID] dissolved.

Once the oil phase temperature decreased to 50° C., mixing was stopped and the water phase was added to the mixed oils. High shear agitation was applied to produce an emulsion with the desired size characteristics (1900 rpm for 60 minutes).

The temperature was increased to 75° C. in 30 minutes, held at 75° C. for 4 hours, increased to 95° C. in 30 minutes, and held at 95° C. for 6 hours.

Fabric treatment compositions Examples 1 to 3 were prepared as described below. Water and polyacrylate perfume capsule was mixed together in a plastic beaker with a blade mixer. In example 2 and 3 also brightener premix was added, starting from a brightener premix. The brightener 15 premix for Example 2 was made by mixing Brightener 15, diethylene glycol and monoethanolamine together in a plastic beaker with a blade mixer.

Brightener 15 corresponds to formula

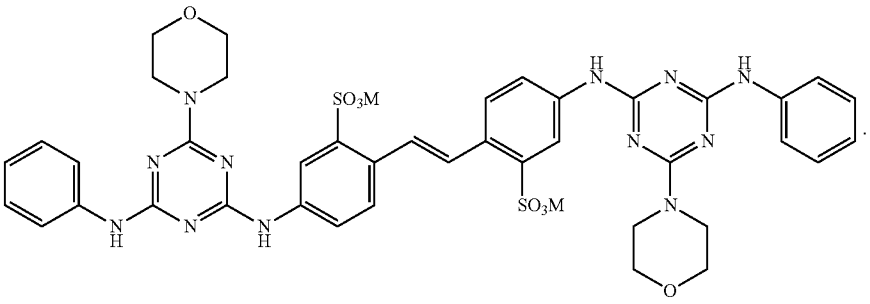

The brightener 36 premix for Example 3 was made by mixing Brightener 36, 1,2-propanediol and ethoxylated alcohol together in a plastic beaker with a blade mixer.

Brightener 36 corresponds to formula

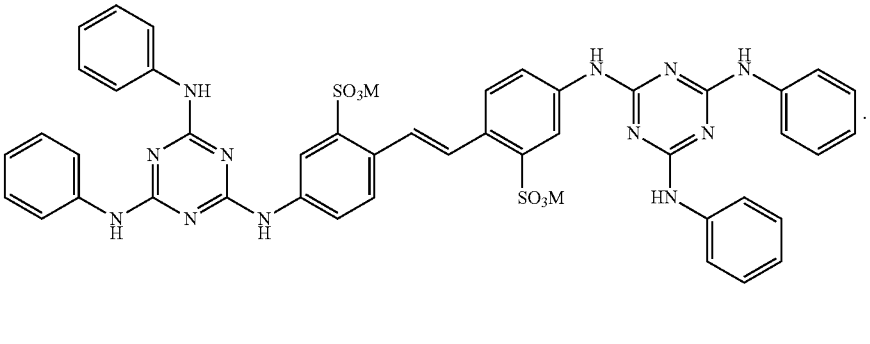

The premixes were made to enable homogeneous distribution of the brightener. The detailed composition of the fabric treatment compositions (Ex. 1-3) is provided in Table 1.

Method to Treat Fabrics with Compositions of Table 1

A small-scale washing machine simulator—called Launderometer—was used. The Launderometerjar was loaded with 4 pieces of 3 g terry fabric. 2.5 g of the fabric treatment composition was added to 1 L city water. 350 ml of this solution (city water+fabric treatment composition) was added in the Launderometerjar to the fabrics. The Launderometer cycle time was set at 7 min, temperature is set at 25 C. After the Launderometer cycle, the fabrics were transferred to a Miele WM and centrifuged at 1200 rpm for 7 minutes. Then fabrics were dried in an oven at 60° C. for 30 minutes. The dry fabrics are analyzed for benefit agent capsule deposition (see METHODS).

TABLE 1 compositional details of example 1-3. Example 1 is a comparative example indicated with an asterisk.

| | Ex. 1* | Ex. 2<br>Weight % | Ex. 3 |
|---|---|---|---|
| Water | | Balance to 100% | |
| Diethylene glycol | 0.0 | 0.25 | — |
| Monoethanolamine | 0.0 | 0.67 | — |
| 1,2-propanediol | 0.0 | — | 0.55 |
| Ethoxylated alcohol | 0.0 | — | 0.37 |
| Polyacrylate perfume capsules wherein the shell material is derived from polyvinylalcohol | 0.17 | 0.17 | 0.17 |
| Brightener | — | 0.08 | 0.08 |
| Brightener type | — | Brightener 15 | Brightener 36 |
| Deposition Polyacrylate perfume capsules [%] | 45% | 67% | 62% |

The deposition of benefit agent capsules wherein the shell material is derived from polyvinylalcohol, in absence of a diaminostilbene brightener was 45% while Example 2 and 3, comprising a brightener according to the present invention, showed an improved deposition of 67% and 62%, respectively. Brightener 15 was supplied by BASF under the tradename Tinopal DMA-X Conc., 86% active, and premixed with diethylene glycol, 100% active, supplied by Indorama Ventures, and monoethanolamine, 100% active, supplied by Huntsman. Brightener 36 was supplied by 3V Sigma under the tradename Optiblanc ULD, 90% active, and premixed with 1,2-propanediol, 100% active, supplied by Ineos and ethoxylated alcohol, supplied by Sasol under the trade name Lorodac 7-26, 100% active.

Fabric treatment compositions 4 to 6 were prepared as described below. Water, citric acid and solvents were mixed together in a plastic beaker with a blade mixer. To this mixture surfactants, chelant, builder and polymers were added while mixing. The final pH was trimmed with ethanolamine to a pH (10% dilution) of around 7.5. The mixture was then cooled to ambient temperature and during further mixing dye, enzymes, polymers, preservatives, processing aids and a structurant are added. For Examples 5 and 6 also Brightener premix was added. The brightener 15 premix for Example 5 was made by mixing Brightener 15, diethylene glycol and monoethanolamine together in a plastic beaker with a blade mixer. The brightener 36 premix for example 6 was made by mixing Brightener 36, 1,2-propanediol and ethoxylated alcohol together in a plastic beaker with a blade mixer. The premix was made to enable homogeneous distribution of the brightener. Details of the fabric treatment compositions are provided in Table 2.

Method to Treat Fabrics with Compositions of Table 2

For each test, the Launderometer jar was loaded with 4 pieces of 3 g terry fabric. Fabric treatment compositions were prepared as described below and 2 g of the fabric treatment composition was added to 1 L city water. 350 ml of this solution (city water+fabric treatment composition) was added in the Launderometer jar to the fabrics. The Launderometer cycle time is set at 9 min, temperature is set at 30° C. After the Launderometer cycle, the fabrics are transferred to a Miele WM and centrifuged at 1200 rpm for 7 minutes. Then fabrics are dried in an oven at 60° C. for 30 minutes. The dry fabrics are analyzed for benefit agent capsule deposition as described in "Method to measure benefit agent capsule deposition".

TABLE 2 compositional details of example 4-6. Example 4 is a comparative example.

| Ingredients on 100% active basis | Ex. 4* | Ex. 5 | Ex. 6 |
|---|---|---|---|
| Water | | Balance to 100 | |
| citric acid | 1.10 | 1.10 | 1.10 |
| 1.2-propanediol | 11.75 | 11.75 | 12.43 |
| dipropylene glycol | 5.85 | 5.85 | 5.85 |
| mono ethanol amine | 11.78 | 12.62 | 11.78 |
| glycerine | 5.87 | 5.87 | 5.87 |
| 1-Hydroxyethane-1,1-diphosphonic acid | 3.52 | 3.52 | 3.52 |
| potassium sulfite | 0.85 | 0.85 | 0.85 |
| ethoxylated alcohol | 3.19 | 3.19 | 3.65 |
| Dodecyl Benzene Sulphonic Acid | 32.86 | 32.86 | 32.86 |
| diethylenegylcol | 0.00 | 0.31 | 0.00 |
| co-polymer of Polyethylene glycol and vinyl | 2.56 | 2.56 | 2.56 |
| antifoam | 0.30 | 0.30 | 0.30 |
| enzymes | 0.08 | 0.08 | 0.08 |
| Dyes | 0.01 | 0.01 | 0.01 |
| Hydrogenated Castor Oil structurant | 0.13 | 0.13 | 0.13 |
| Polyacrylate Perfume Capsule | 0.18 | 0.18 | 0.18 |
| Optical Brightener | 0.00 | 0.12 | 0.12 |
| citric acid | 1.10 | 1.10 | 1.10 |
| 1.2-propanediol | 11.75 | 11.75 | 12.43 |
| dipropylene glycol | 5.85 | 5.85 | 5.85 |
| Mono ethanol amine | 11.78 | 12.62 | 11.78 |
| glycerine | 5.87 | 5.87 | 5.87 |
| 1-Hydroxyethane-1,1-diphosphonic acid | 3.52 | 3.52 | 3.52 |
| potassium sulfite | 0.85 | 0.85 | 0.85 |
| ethoxylated alcohol | 3.19 | 3.19 | 3.65 |
| Dodecyl Benzene Sulphonic Acid | 32.86 | 32.86 | 32.86 |
| Diethylenegylcol | 0.00 | 0.31 | 0.00 |
| co-polymer of Polyethylene glycol and vinyl | 2.56 | 2.56 | 2.56 |
| antifoam | 0.30 | 0.30 | 0.30 |
| enzymes | 0.08 | 0.08 | 0.08 |
| dyes | 0.01 | 0.01 | 0.01 |
| Hydrogenated Castor Oil structurant | 0.13 | 0.13 | 0.13 |
| Polyacrylate Perfume Capsule | 0.20 | 0.20 | 0.20 |
| Optical Brightener | 0.00 | 0.10 | 0.10 |
| Type of optical Brightener | — | Brightener 15 | Brightener 36 |
| Deposition Polyacrylate perfume capsules [%] | 27 ± 3 | 66 ± 5 | 46 ± 5 |

It is clear from Table 2 that the deposition of encapsulated perfume was improved by the presence of Brightener 15 (ex. 5) and Brightener 36 (ex. 6) as compared to the comparative example 4. Brightener 15 (ex. 5) showed a further improvement in deposition over Brightener 36 (ex. 3).

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A fabric treatment composition comprising:

a) from about 0.01 wt % to about 10 wt % by weight of the fabric treatment composition of benefit agent capsules wherein the benefit agent capsules comprise a shell material encapsulating a core material,
   wherein said shell material is derived from polyvinylalcohol and a shell component wherein said shell component is selected from the group consisting of polyacrylate, polyamine, polyurea, polyurethane and mixtures thereof;
   wherein the polyvinylalcohol has a degree of hydrolysis of about 70% to about 99%;
   said core material comprises perfume raw materials,
   wherein the perfume raw materials are present in an amount of from 20% to 98%, by weight of the benefit agent capsules;
b) from about 0.1% to about 0.5% by weight of the fabric treatment composition of a diaminostilbene brightener consisting of:

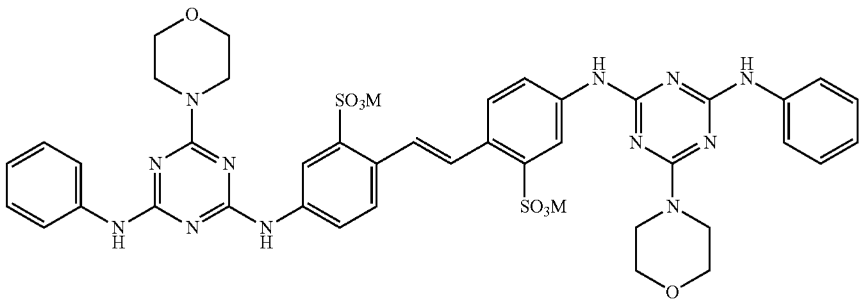

wherein M is a suitable cation;

wherein the weight ratio of diaminostilbene brightener to benefit agent capsules is from 5/1 to 1/100;

wherein the weight ratio of polyvinylalcohol to brightener is from about 1/1 to about 1/500, and the level of polyvinylalcohol is from about 0.01% to about 20% by weight of the benefit agent capsules;

wherein the fabric treatment composition is a liquid.

2. The fabric treatment composition according to claim 1 wherein the polyvinylalcohol as a 4 wt % solution in water has a viscosity of from about 2 mPa·s to about 150 mPa·s.

3. The fabric treatment composition according to claim 1 wherein the level of polyvinylalcohol is from about 0.1 to about 2% by weight of the benefit agent capsules.

4. The fabric treatment composition according to claim 1 wherein the fabric treatment composition further comprises a surfactant selected from the group consisting of nonionic, anionic, cationic, zwitterionic surfactants and combinations thereof.

5. The fabric treatment composition according to claim 1 wherein the level of surfactant is from about 1 wt % to about 70 wt %, by weight of the fabric treatment composition.

6. The fabric treatment composition according to claim 1 wherein the level of surfactant is from about 10 wt % to about 40 wt % by weight of the fabric treatment composition.

7. The fabric treatment composition according to claim 1 wherein the level of surfactant is from about about 15 wt % to about 30 wt % by weight of the fabric treatment composition.

* * * * *